May 5, 1970  C. J. VASSBERG  3,509,945
SUPPORT FRAMEWORK FOR FARM IMPLEMENTS
Filed March 9, 1967  2 Sheets-Sheet 1
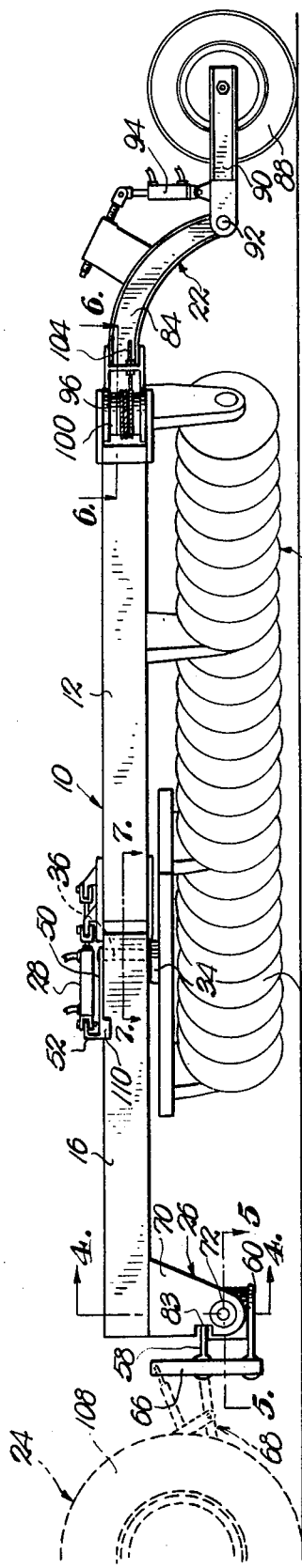
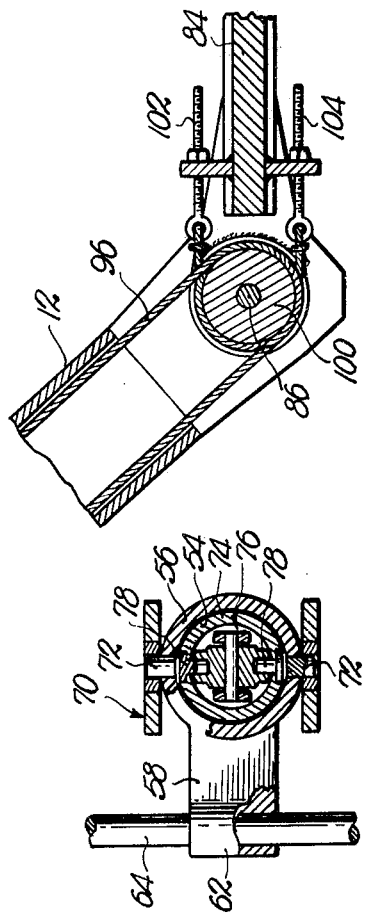
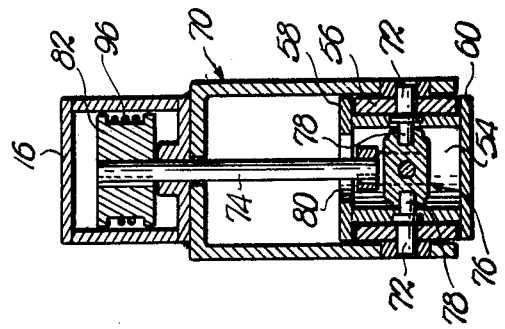
INVENTOR
Charles J. Vassberg
BY
ATTORNEYS May 5, 1970 C. J. VASSBERG 3,509,945
SUPPORT FRAMEWORK FOR FARM IMPLEMENTS
Filed March 9, 1967 2 Sheets-Sheet 2
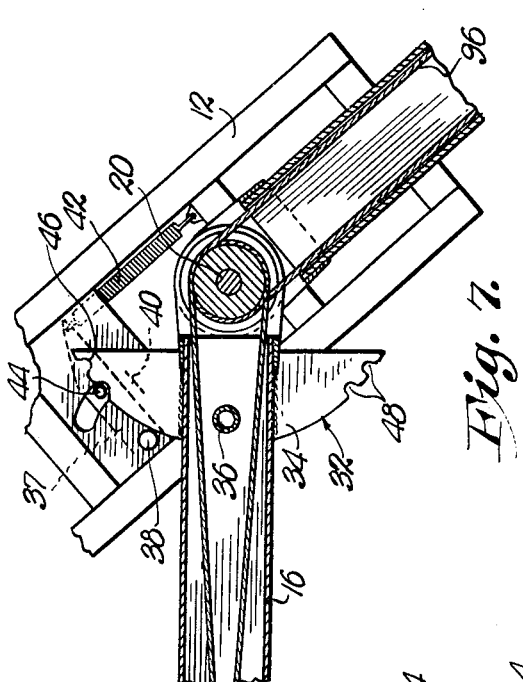
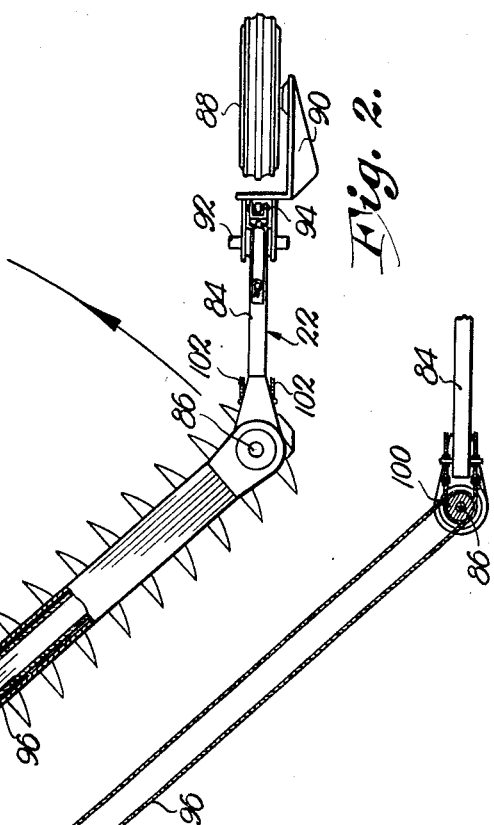
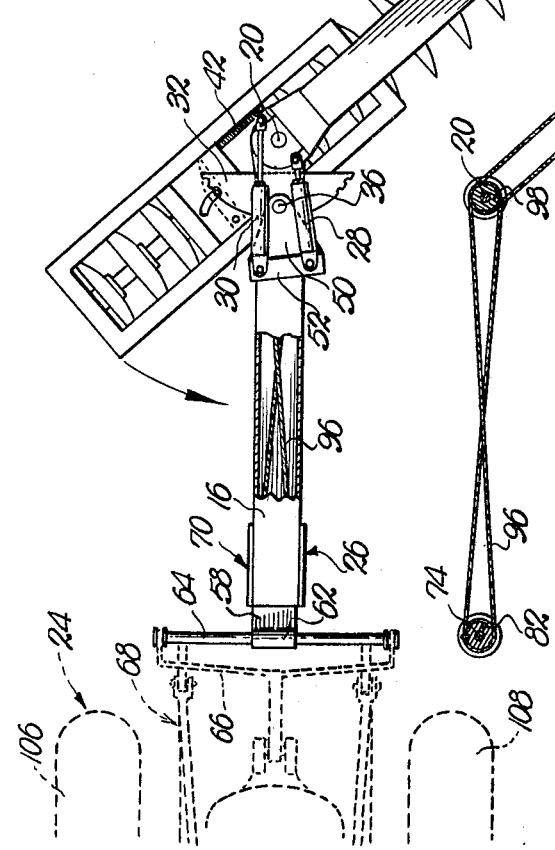
INVENTOR
Charles J. Vassberg
BY
ATTORNEYS United States Patent Office 3,509,945
Patented May 5, 1970

3,509,945
SUPPORT FRAMEWORK FOR FARM
IMPLEMENTS
Charles J. Vassberg, Rte. 1, Box 201,
Lyford, Tex. 78569
Filed Mar. 9, 1967, Ser. No. 621,938
Int. Cl. A01b 69/00, 65/00
U.S. Cl. 172—285                5 Claims

ABSTRACT OF THE DISCLOSURE

A farm implement, such as a two-way plow, has a pair of articulated beams permitting swinging of the implement-supporting beam to two operating positions extending in opposite directions at an angle to the path of travel of the implement. A hitch to the tractor controls the relationship of the line of draft to the tractor through a steering connection with a swiveled wheel assembly. The hitch includes not only a universal joint behind a tow bar but is provided with a coupling that slides freely along the tow bar, permitting sharp, virtual 90° turns without danger of the implement tipping over as would be true of conventional structures if not held to limited turning.

---

It is the primary object of the instant invention to provide a farm implement having a support framework whose articulated beams are arranged in a manner to permit the implement-carrying beam to be extended laterally at an angle in opposite directions, rendering the implement especially advantageous when used as a two-way plow.

Another important object of my present invention is to provide a novel steering control for farm implements that is responsive to turning movement by the towing vehicle, such as a tractor. Such control not only locates the line of draft of the implement in proper relationship to the tractor but permits swinging of the implement-carrying beam to the right or to the left with the line of draft properly located in any of the selected positions.

In connection with the above it is another important object of the instant invention to provide a novel hitch in the nature of a universal joint located rearwardly of the tow bar of the tractor and slidable thereon so that the line of draft is proper and so that a proper relationship is maintained between a ground wheel and the hitch beam of the support framework.

In the drawings:

FIG. 1 is a side elevational view of support framework for farm implements made according to my present invention;

FIG. 2 is a plan view thereof;

FIG. 3 is a diagrammatical view of the pulley and cable system;

FIG. 4 is an enlarged cross-sectional view taken on line 4—4 of FIG. 1;

FIG. 5 is a fragmentary, enlarged cross-sectional view taken on line 5—5 of FIG. 1;

FIG. 6 is a fragmentary, enlarged cross-sectional view taken on line 6—6 of FIG. 1; and FIG. 7 is an enlarged, fragmentary cross-sectional view taken on line 7—7 of FIG. 1.

Support framework 10 has one of its beams 12 disposed to carry implement 14, the other primary component of framework 10 being in the nature of a hitch beam 16. The implement 14 chosen for illustration of the principles of the instant invention is in the nature of a bank of discs 18. Accordingly, by virtue of pivot means 20, presenting an upright axis between the beams 12 and 16, the implement 14 may properly be referred to as a two-way plow.

The beam 12 is supported at its rearmost end by a wheel assembly 22 whereas the forwardmost end of the beam 16 is supported by tractor 24 through the medium of a novel hitch broadly designated by the numeral 26. During over-the-road travel the beam 12 is swung about the pivot 20 to a position trailing the beam 16 in alignment with the latter, and at that time also the wheel assembly 22 trails the beam 12 in alignment with the latter.

On the other hand, when the implement 14 is used for tillage purposes the beam 12 extends laterally from the beam 16 at an angle to the normal path of travel of the tractor, either as illustrated in FIG. 2 or with the beam 12 swung to a position extending oppositely from the beam 16. Swinging of the beam 12 is accomplished by a pair of piston and cylinder assemblies 28 and 30, and the beam 12 is held in the selected operating position by a releasable latch unit 32.

Latch 32 includes a cam plate 34 rigid to a vertical pin 36, the latter of which is in turn rotatable in the beam 16. Beam 12 carries a swingable locking arm 37 which swings about a pivot 38 and is yieldably held against a stop 40 on beam 12 by a spring 42. Locking pin 44 engages in either one of a number of notches 46 or in one of a number of notches 48 in the arcuate edge of the cam plate 34.

A second plate 50 is also rigid to the pivot pin 36 for cam plate 34, the cylinders of the assemblies 28 and 30 being pivotally connected with a crossbar 52 rigid to the plate 50. The piston rods of the assemblies 28 and 30 are pivotally connected with the beam 12 on opposite sides of the vertical pivot 20 between the beams 12 and 16 as illustrated in FIG. 2 of the drawings.

Hitch 26 includes a pair of relatively rotatable innerconnected elements 54 and 56 having a common upright axis of rotation and being in the nature of cylinders. The inner cylinder 54 has its top and bottom covered by plates 58 and 60 which terminate in sleeves 62. A tow bar comprises a pair of normally horizontal rods 64 which traverse the normal path of travel of the towing vehicle 24 and of the implement 14, sleeves 62 being freely reciprocable on corresponding rods 64 throughout the lengths of the latter.

Parallel rods 64 are rigidly connected to a suitable frame 66 which is in turn carried by the three point linkage of the power lift 68 of tractor 24.

The coupling which forms a part of the hitch 26 includes also a yoke 70 rigid to the beam 16 and having its legs embracing the outer cylinder 56 as seen both in FIGS. 4 and 5. A pair of opposed pintles 72 connect the yoke 70 with the cylinder 56 for swinging movement of the beam 16 relative to the tractor 24 about the common horizontal axes of pintles 72.

An upright shaft 74 has a universal joint 76 within the cylinder 54 and connected with the latter by opposed trunnions 78 so that the shaft 74 rotates with the cylinder 54 in response to turning movement by the tractor 24. The common axis of trunnions 78 of the universal joint 76 is always in a common cross sectional plane through cylinders 54 and 56 in which the common axis of pintles 72 rotate around the upright axis of cylinders 54 and 56 as tractor 24 turns. This permits yoke 70 to swing about pintles 72 regardless of the angle of beam 16 with respect to rods 64, and since the shaft 74 must swing therewith, a clearance opening 80 for the shaft 74 is provided in the uppermost plate 58.

Shaft 74 is journaled in the bight of yoke 70 and in the beam 16 with limited up and down movement, and it has a pulley 82 rigid therewith and housed in beam 16. The legs of yoke 70 each have a notch 83 for clearing plate 58, permitting essentially a 90° turn of beam 16 relative to the direction of travel of tractor 24.

The wheel assembly 22 includes an arm 84 that extends downwardly and rearwardly from the rearmost end of the beam 12, the arm 84 swiveling about an upright pivot pin 86 that connects the assembly 22 with beam 16.

Ground engaging wheel 88 is carried by a rearward extension 90 from the arm 84 and connected with the arm 84 by horizontal pivot pin 92.

The height of the implement 14 is controlled not only by the power lift 68 of the tractor 24 but by a piston and cylinder assembly 94 between the arm 84 and its vertically swingable extension 90.

A cable 96 is wrapped around and rigidly attached to the pulley 82. Cable 96 is also wrapped around a second pulley 98 rotatable on the pivot pin 20 and cable 96 is additionally wrapped around a third pulley 100 rotatable on the pivot pin 86. The terminal ends of the cable 96 are secured to adjusting bolt and nut means 102 and 104 on the arm 84 of the assembly 22. Attention is called to the fact that the stretches of the cable 96 between the pulleys 82 and 98 are crossed over as illustrated in FIGS. 2 and 3, whereas the stretches of the cable 96 between the pulleys 98 and 100 are in parallelism.

When the implement is placed in tow by the tractor 24 the wheel 88 will ride in the furrow by virtue of the disposition of the pivot pin 86 directly above the rearmost disc 18. The arrangement is such also that the line of draft of the implement passes through a point centered between the two rear wheels 106 and 108 of the tractor 24.

When turns are made by the tractor 24 the sleeves 62 slide freely along the rods 64, thereby maintaining the position of the line of draft passing substantially through the midpoint between wheels 106 and 108.

Furthermore, such turning movement on the part of tractor 24 is transmitted to the shaft 74 from the rods 64, i.e., through the sleeves 62, the plates 58 and 60, and the inner cylinder 54. As a consequence of such rotation of shaft 74, and therefore the pulley 82, cable 96 is controlled to impart a corresponding swinging movement in the arm 84. That is to say, the arm 84 and its extension 90 remain parallel to the beam 16 as long as the rods 64 are perpendicular to beam 16 as shown in FIG. 3. However, any angular displacement of rods 64 in either direction out of perpendicular relationship to beam 16 will produce an angular displacement (opposite in rotation) of arm 84 and its extension 90 with respect to beam 16, i.e. arm 84 and extension 90 are not parallel to beam 16 during turning.

When it is desired to change the angular relationship of the beam 12 to the beam 16 power means 28–30 is actuated, the initial reaction being the swinging of plate 50, pin 36 and cam 34 with respect to beam 16 about the vertical axis of the pivot pin 36. The crossbar 52 is provided with a pair of downturned stops 110 at the ends thereof which embrace the beam 16 as best seen in FIG. 1, the distance between the two stops 110 being greater than the width of beam 16 across the top of the latter. Such initial movement of the cam plate 34 forces the pin 44 out of notch 46 and places the notches 48 in position for receiving the pin 44 after the beam 12 has been swung around to the opposite position. That is to say, as soon as one of the stops 110 comes into contact with the beam 16 further actuation of the corresponding piston and cylinder assembly 28 or 30 as the case may be causes the beam 12 to swing about the pivot 20 and with respect to the beam 16. It is to be appreciated that any number of notches 46 or 48 may be provided in the plate 34 as desired, the unused notches merely being provided with a plug over which the pin 44 rides as it slides along the arcuate edge of the cam plate 34.

During such swinging of the beam 12 and by virtue of the pulley 82 remaining stationary, the wheel assembly 22 is caused to automatically swing to the new proper position by the action of cable 96 on the arm 84. It can also now be appreciated that for over-the-road travel the power means 28 and 30 may be operated to place the beam 12 and the assembly 22 in aligned trailing relationship to the beam 16.

Having thus described the invention, what is claimed as new and desired to be secured by Letters Patent is:

1. In a support framework for farm implements,
a pair of elongated, substantially horizontal beams having their longitudinal axes aligned with the normal path of movement of the implement during over-the-road travel;
pivot means interconnecting the beams for swinging movement of one of the beams about an upright axis to preselected operating positions extending laterally at an angle in either of two opposite directions from the other beam;
releasable means for holding said one beam in the selected position;
hitch means at one end of said other beam adapting the same for attachment to a towing vehicle, said hitch including:
a normally horizontal tow bar adapted for connection to the vehicle in transverse relationship to its direction of movement, and a coupling on said other beam provided with upright hinge means about which said other beam swings relative to said vehicle during turning of the latter,
said coupling being freely reciprocable along said tow bar longitudinally of the latter whereby to maintain a predetermined relationship between the vehicle and the line of draft of said implement,
said coupling having a pair of elements interconnected for rotation relatively about a common upright axis, presenting said hinge means; and
means connecting said other beam to one of said elements for swinging movement of the other beam relative to said one element about an axis transversing said normal path of travel,
the other of said elements being reciprocable on the tow bar and rotatable relative to said one element about said common axis during and in response to turning movement of said vehicle.

2. In a farm implement, a hitch for attaching the implement to a towing vehicle, said hitch including:
a coupling having a pair of elements interconnected for rotation relatively about a common upright axis,
means for connecting the implement to one of said elements for swinging movement of the implement relative to said one element about an axis traversing the path of travel of the implement;
means for securing the other element to the vehicle for rotation of said other element relative to said one element about said common axis during and in response to turning movement of said vehicle,
said means for securing the other element to the vehicle including a tow bar extending across said path of travel, and
means mounting the other element on the tow bar for free reciprocation therealong; and
steering mechanism for the implement including:
a wheel assembly supporting the implement and attached thereto for swinging movement about a second upright axis, and structure connecting said other element with said assembly for swinging the latter about said second upright axis in response to rotation of said other element relative to the one element about said common axis,
said structure including a cable and pulley system having a pulley attached to said other element for rotation therewith, a pulley attached to said assembly for swinging movement therewith, and cable means interconnecting said pulleys.

3. For use with a farm implement:
a support framework for said implement;

hitch means at one end of the framework adapting the same for attachment to a towing vehicle;

a wheel assembly supporting the opposite end of the framework, said hitch means including a pair of elements interconnected for rotation relatively about a common upright axis;

swivel means attaching said assembly to the framework for swinging movement of the assembly about a second upright axis;

upright shaft means on said common upright axis rotatable in response to turning movement of the vehicle relative to the framework;

structure operably interconnecting the shaft means and said assembly for swinging the latter about said second axis in response to rotation of the shaft means;

hinge means connecting the framework with one of said elements for swinging movement relative to the latter about a third axis intersecting the common upright axis; and hinge means connecting the other element with said shaft means for movement of the latter relative to the other element about a fourth axis aligned with said third axis.

4. In a support framework for farm implements, a pair of elongated, substantially horizontal beams having their longitudinal axes aligned with the normal path of movement of the implement during over-the-road travel;

pivot means interconnecting the beams for swinging movement of one of the beams about an upright axis to preselected operating positions extending laterally at an angle in either of two opposite directions from the other beam;

releasable means for holding said one beam in the selected position, said releasable means including pin means rotatably carried by said other beam, a pair of plates rigid to the pin means, and latch means on said one beam releasably connected to one of the plates;

power means connecting the other plate with said one beam for swinging the plates and the pin means and for swinging the one beam about said upright axis, said other plate having stop means engageable with the other beam for limiting the extent of swinging movement of the plates with said pin means whereby, upon initial actuation of the power means, the pin means is rotated to release said one plate from the latch means.

5. The invention of claim 4, said latch means including a spring-loaded locking pin, said one plate having spaced notches adapted to hold the one beam in either of said two opposite directions.

References Cited

UNITED STATES PATENTS

| | | | |
|---|---|---|---|
| 3,061,020 | 10/1962 | Mannhelm | 172—285 |
| 2,322,342 | 6/1943 | Bunn | 172—285 X |
| 2,675,749 | 4/1954 | Pursche | 172—324 X |
| 2,871,030 | 1/1959 | Hollis | 280—492 |
| 3,167,327 | 1/1965 | Bumpious | 172—324 X |

ROBERT E. PULFREY, Primary Examiner

S. C. PELLEGRINO, Assistant Examiner

U.S. Cl. X.R.

172—291, 324; 280—492